United States Patent Office 3,457,201
Patented July 22, 1969

3,457,201
CELLULAR PRODUCTS AND METHOD
OF MANUFACTURE
Howard S. Smith, Asheville, and Thomas Trogdon and Thomas C. Holt, Waynesville, N.C., assignors to Dayco Corporation, Dayton, Ohio, a corporation of Ohio
No Drawing. Continuation-in-part of application Ser. No. 320,548, Oct. 31, 1963. This application Mar. 10, 1965, Ser. No. 438,745
Int. Cl. C08d 13/08
U.S. Cl. 260—2.5                10 Claims

ABSTRACT OF THE DISCLOSURE

A foamed product of reduced fight-back is the reaction product of a filled base latex and a second latex, the base latex having a Mooney viscosity of between 100 and 160, a particle size in the range of 1,000 to 7,500 A. and being either a styrene-butadiene copolymer or an acrylonitrile butadiene copolymer. The filler is present in an amount between 5 and 25 parts by weight of the base latex and is in the form of a finely divided resin material. The second latex has a Mooney viscosity of between 10 and 70, a particle size in the range of 2,000 to 10,000 A. and is either polyisoprene or a polymer of 1,3-pentadiene. The second latex, present in an amount between 20% and 80% of the combined weight of the two latices operates to provide reduced fight-back. The product has a free rate of return of between 16 and 22 inches per second, an RMA compression value of between 2 and 5 pounds, a density of between 2 and 3.5 pounds per cubic foot and a tensile strength of between 27 and 30 pounds.

---

This application is a continuation-in-part of application Ser. No. 320,548, filed Oct. 31, 1963, now abandoned.

This invention relates to cellular resilient products and more particularly to an improved cellular resilient product made by vulcanizing foamed latex materials which are formed from an aqueous dispersion of synthetic or natural elastomeric materials and resinous polymers. The invention further relates to the method of making such products.

In general, the procedure for forming a cellular resilient product includes the steps of agglomerating the basic latex to increase the particle size thereof, adding to the agglomerated latex any desired modifying or compounding materials, and introducing the mixture into suitable molds. While in the mold, the mixture is foamed and further processed to provide a cellular product which is stripped from the mold after vulcanization has been completed.

The manufacture of cellular resilient products from foamed latex materials has become an important factor in the bedding and furniture industry. The use of foam latex rubber for pillows, cushions, and mattresses provides a product which is comfortable to use, is of fine quality, and has a long life. Such products are normally made of natural or synthetic rubber latices, such as described in the series of United States patents to Talalay, including, among others, Nos. 2,432,353, 2,604,663, and 2,786,038.

Despite the quality of the product produced by these methods, certain of the consuming public is not satisfied with the feel of the resultant pillow or cushion. These consumers complain that the pillow is a little too lively and has a rigid comeback; this is often referred to as excessive "fight-back." Many attempts have been made in the prior art to reduce "fight-back" by incorporating various amounts of inert filler materials such as chalk, whiting or talc; or by reducing the density of the latex; or by the combinations of both. The introduction of inert fillers or reduction in density of the cellular product tends to reduce the tensile strength thereof thus giving rise to problems during manufacture and handling, for example, tearing of the cellular product during removal from the mold, or tearing or damage during handling or packaging or the like.

In accordance with the present invention the above problems are overcome by the use of a latex which is a mixture of a synthetic rubber latex and a latex of an elastomeric material having a relatively low Mooney viscosity. Mixing these two latices to form a finished latex, which is subsequently foamed into a finished product, results in a product which has the desired reduced fight-back without the reduction in tensile strength which has been characteristic of the prior art products. An improved latex has thus been provided which permits the formation of the desirable end product, and a product having new, improved and different properties.

Accordingly, it is a principal object of the present invention to provide a vulcanized foamed resilient latex having improved properties.

It is a further object of the present invention to provide a product of the type described which is resilient and soft, and exhibits lessened "fight-back" properties comparable to feather or down products.

It is a further object of the present invention to provide a product of the type above described having maximum strength and relatively low "fight-back."

A further object of the present invention is the provision of a foamed resilient latex including a mixture of a synthetic rubber latex and an elastomeric latex having a relatively low Mooney viscosity.

It is a further object of the present invention to provide a method of making a product of the type above described.

In carrying out the principles of the present invention, an aqueous latex dispersion is formed by mixing or blending two latices. The first of the latex materials to be used in the mixture is a synthetic rubber latex dispersed in an aqueous carrier and having a particle size range of about 1,000 to 7,500 angstrom units and preferably such that approximately between 70% and 85% thereof is less than 6,000 angstrom units while between 10% and 15% thereof is of a particle size less than 1,000 angstrom units. Between 50% and 55% of the latex is of a particle size less than about 3,000 to 4,000 angstrom units and thus relatively large, thereby requiring less total amounts of soap in the mixture in order to substantially completely coat each latex particle for forming a rigid foam prior to vulcanization thereof. As supplied, the latex is of a much smaller particle size, and the particle size thereof is increased by an agglomeration procedure which may be of the type previously known in the art.

The raw or base latex is preferably an emulsion polymerized product which is maintained in a stable dispersed form by a fatty acid soap and which latex forms a rigid froth as will be described more fully hereinbelow. The raw latex as supplied to the user is generally of a particle size far too small for formation of cellular resilient products, and the first step in producing the product of the present invention is an agglomeration procedure by which the raw latex is increased in particle size preferably in the range previously specified. The latex may be a styrene butadiene resin copolymer including varying amounts of bound or copolymerized styrene, for example, between 1% and 30%. With a low percentage of bound styrene, the copolymer and product made therefrom exhibit a low hot wet tensile; that is, the foamed product is difficult to strip from the mold after vulcanization thereof. Typical raw latex materials include elastomeric materials such as acrylontrile, chloroprene, neoprene, copolymers of acrylonitrile and butadiene in addition to the copolymers previously mentioned. If processing conditions allow, the low hot wet strength tensile may not be a disadvantage since the vulcanized foam may be allowed to cool and dry before stripping it from the mold.

If the percentage of bound styrene exceeds about 30%, the resultant vulcanized foam tends to stiffen when exposed to cold and thus the material is not readily usable for products which are to be exposed to relatively low temperatures. Accordingly, it is preferred that the raw latex include between about 10% and 20% bound or copolymerized styrene, and a bound styrene content of 16% has been found to operate satisfactorily.

The base latex may be monoagglomerated to increase the particle size thereof, or may be coagglomerated with a finely divided material such as polystyrene, polyethylene or materials such as polyacrylontrile, polychloroprene, acrylic materials in homopolymer form or copolymerized with other materials, such as methacrylate and nitrile rubbers, or mixtures thereof. The coagglomerate may accordingly be any of the elastomeric products heretofore used in which instance the raw latex operates to encapsulate the coagglomerate. It is also possible in accordance with the present invention to coagglomerate the raw latex with any of the elastomers or materials previously noted, and after the agglomeration to add additional amounts of elastomeric latex to form the first of the latex materials to be used in accordance with the present invention.

In the case of the monoagglomerated base latex materials followed by the addition of a second material such as polystyrene as noted above, the resultant monoagglomerated mixture appears to be in the form of particles of the base latex with the second material closely associated with the particles in the aqueous dispersion. In the case of coagglomerated materials, the base latex tends to surround or envelop at least a portion of the added second material. In a case where a portion of the added material is coagglomerated and the remaining portion is thereafter added to the coagglomerate, the resulting base latex includes both encapsulated and dispersed additive material. The addition of a resin or polymer material to the base latex either by mechanical mixture therewith or by coagglomeration or by combination thereof operates to increase the tensile strength of the base latex this providing a final product which may be stripped from the mold without encountering excessive loss due to ripping or tearing of the final foamed product. The coagglomerated latex or mixture of base latex and added material includes a total of between 5 and 25 parts by weight of added resin or polymeric materials of the type previously described per 100 parts of the base latex.

The second latex is preferably a relatively soft elastomeric material having a relatively high tensile strength and a relatively low Mooney viscosity, for example, a material having a molecular weight in the range of 50,000 to 1,000,000 molecular weight units. A typical material which may be used as the second latex is an aqueous dispersion of isoprene(3-methyl 1,3 butadiene) or 1,3 pentadiene, and preferably those dienes having unsubstituted methylene groups.

The second latex in a sense operates as a filler but differs from the conventional fillers such as clay, talc, diatomaceous earth and the like in two significant respects. First, the second latex does not reduce the tensile strength to the point where tearing and the like are major problems during the foaming and vulcanizing procedure. Secondly, and equally important, the use of a second latex reduces "fight-back" or lively comeback of the vulcanized foam after compression thereof. The use of a second latex which has a Mooney viscosity somewhat less than that of the base latex thus provides a vulcanized foamed product which possesses the required softness to avoid fightback while maintaining tensile strength of the vulcanized material. In accordance with the present invention, the first latex material has a Mooney viscosity between about 100 and 160, while the second latex has a Mooney viscosity between about 10 and 70.

The second latex contains particles primarly in the range of 2,000 to 10,000 angstrom units (about 75% of the particles being in this range), and is physically mixed with the agglomerated base latex in the ratio of between 80% and 20% of the first latex by weight on a solids basis. The agglomerated base or first latex is in an aqueous dispersion of between 60% and 69% solids content; and has a particle size from 1,500 to 7,500 angstrom units, a Mooney viscosity ($ML_4$) of between 100 and 160, a pH of 8.5 to 11.0, a Brookfield viscosity of between 200 and 2,000 cps., and minimum mechanical stability of 15 minutes. The second latex is in an aqueous dispersion of between about 60% and 69% solids content, and has a particle size from 6,500 to 7,500 angstrom units, a Mooney viscosity ($ML_4$) of 50 to 75, a pH of 8.5 to 11.0, a Brookfield viscosity of 200 to 500 cps., and a minimum mechanical stability of 25 minutes.

Typical formulations are as follows:

|  | Parts per hundred dry weight | |
| --- | --- | --- |
|  | Example 1 | Example 2 |
| Synthetic latex, 61% solids | 30.5 | 38.0 |
| Isoprene latex, 65% solids | 45.5 | 38.0 |
| Ammonia | 0.5 | 0.5 |
| Ammonium ricinoleate | 0.9 | 0.9 |
| Potassium oleate | 0.4 | 0.4 |
| Oil | 3.4 | 3.4 |
| Filler | 10.6 | 10.6 |
| Zinc oxide | 3.8 | 3.8 |
| Zinc diethyldithiocarbamate | 1.4 | 1.4 |
| Zinc salt of 2-mercaptobenzothiazole | 0.9 | 0.9 |
| Sulfur | 1.8 | 1.8 |
| Polyoxyethylated fatty alcohol | 0.3 | 0.3 |
| Total | 100.0 | 100.0 |

Ammonium ricinoleate and potassium oleate are added to the mixture to form a stable foam as will be described hereinbelow. The soap which is used is preferably a water soluble salt of a fatty acid such as caster oil or coconut oil, the former including between 80% and 90% of ricinoleic acid, and the latter including between 40% and 90% of lauric acid, or potassium salts of oleic acid, for example. By using these highly soluble soaps, the solids content of the latex mix is not appreciably altered. The filler may be clay, feldspar, or the like and is used as a filler, but is not present in amounts sufficient to reduce the tensile strength of the resultant foam to a point where problems arise during handling as previously described.

The zinc oxide is present in a relatively small amount and perform two separate functions. On one hand it acts as an accelerator or activator, and on the other hand it operates as a precipitating agent for the fatty acid soap which causes the foamed latex to gel prior to vulcanization thereof. The diethyldithiocarbamate and mercaptobenzothiazole salts are accelerators for the sulfur which acts as a vulcanizing agent. The fatty alcohol is used as a dispersing agent for the various components of the latex mixture.

After compounding the various materials, the mixture is subjected to a whipping action of a high speed turbine agitator which forces air into the mixture so that the latex is in the form of a liquid forth mixture of a pH of about 10.5 and with air bubbles entrapped in the latex mixture.

After formation of the liquid foam latex mixture, the final vulcanized resilient product may be obtained by filling a mold one-half to one-third full, followed by drawing a vacuum on the mixture while in the mold. The vacuum causes the liquid mixture to expand further so that the mold is substantially full. After the vacuum, the expanded liquid foam is frozen by reducing the temperature thereof to about 25° F. in order to solidify the mixture temporarily and to cause the pores or bubbles in the mixture to become interconnected. While frozen, gaseous $CO_2$ is forced into the mold in order to lower the pH to between 8 and 8.5. A portion of the zinc oxide has formed as zinc-ammonia complex during the initial mixing thereof while the excess of ammonia has formed the fatty acid salt. As the pH drops due to the acid reaction of the $CO_2$, the complexed zinc reacts to form a zinc salt of the fatty acid salt. The resultant precipitation of the zinc salt of the fatty acid gels the expanded frothed foam in the mold so that it may be heated for vulcanization. This may be done for example by heating the material in the mold for seven to ten minutes at a temperature of between 215° F. and 250° F.

The resultant vulcanized foamed product has a density of between 2 and 3.5 pounds per cubic foot and a tensile strength of between 27 and 30 pounds. The rise-back time may vary from 16 inches per second to 22 inches per second, with a prefered range being about 18 to 20 inches per second. The foam also has an RMA compression value of between 2 and 5 pounds, this latter physical characteristic being indicative of the softness of the product.

Another characteristic of the foam of the present invention is the fact that it is an open cell structure wherein the cells are interconnected to permit exit and entry of air during compression and release of the foamed final product. Accordingly, the vulcanized foam of the present invention includes not less than 90% interconnected open cells which are formed, as previously described, during the freezing operation. The pore size is preferably larger than capillary dimensions and the distribution of pores is approximately that of the foamed products heretofore known.

The reduced "fight-back" or "comeback" is evidenced by a slower rate of return when the product is compressed and allowed to return to its previous state. This factor was measured by recording the free rate of return (sometimes referred to as "rise-back") in terms of inches per second and compared with a conventional product using 100% of a conventional synthetic latex. At the same time, a comparison was also made of the novel product using different percentages of latex. The results of this comparison are plotted below:

The foam material resulting from the above combination has the soft feel of feather or "down," but offers the advantage of having a desirable free rate of return so that a product made of this material assumes its original shape after compression thereof. The return characteristics, however, are not so lively or so fast as to create excessive "fight-back." The rate of return characteristics should not be confused with softness, the former relating to the time the material requires to assume its original shape, while the latter relates to the force required to compress the foam, i.e. RMA compression. For example, a foamed product may have a free rate of return of 16 to 21 inches per second, but an RMA compression of 9 pounds or higher, and thus would be far too hard for use as a pillow having the feel of "down," for example. Conversely, a foamed product might have an RMA compression of 2 to 5 pounds but a rise-back time less than 15 inches per second or greater than 23 inches per second, and thus not comparable in performance to the "down" type products. The foamed product of the present invention not only exhibits acceptable rate of return and softness characteristics, but also it is stable under varying and wide temperature conditions as well as exhibiting a sufficiently high tensile strength to reduce substantial waste during mold separation or handling of the product.

While the products and methods herein described constitute preferred embodiments of the invention, it is to be understood that the invention is not limited to these precise products and methods, and that changes may be made therein without departing from the scope of the invention which is defined in the appended claims.

What is claimed is:

1. A resilient filler product comprising a vulcanized elastomeric material having a free rate of return of between 16 to 22 inches per second, an RMA compression value of between 2 and 5 pounds, a density between 2 and 3.5 pounds per cubic foot, a tensile strength of between 27 and 30 pounds, a cell structure having not less than 90% interconnected open pores, said vulcanized elastomeric material being the vulcanized product of a base

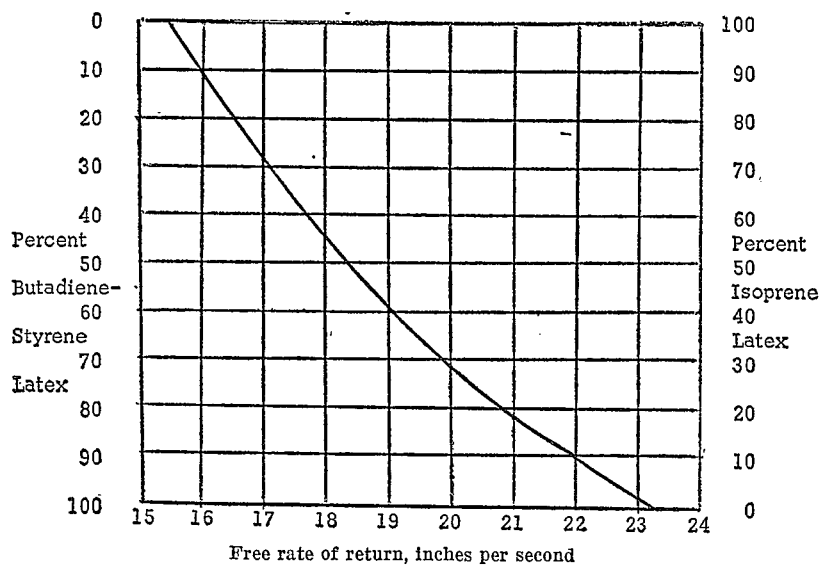

Free rate of return, inches per second

From the above chart, it is seen that the most rapid comeback is achieved with 100% of the conventional synthetic latex, and the slowest comeback occurs at zero percent of conventional synthetic latex (100% isoprene latex). The variation between these points is almost a straight-line relationship, but for the sake of economy, the most practical product will contain about 50% of each product, while 20% to 80% isoprene latex should be considered a workable range for the properties of "fight-back" and RMA compression.

latex and a second latex, said base latex having a Mooney viscosity of between 100 and 160, said base latex being a synthetic rubber latex of particle size in the range of 1,000 to 7,500 A. and being selected from the group consisting of styrene-butadiene copolymers and acrylonitrile-butadiene copolymers, said base latex having admixed therewith between 5 and 25 parts based on the weight of said base latex of a finely divided resin material different from said base latex and said second latex and being selected from the group consisting of polyethylene, polystyrene, polyacrylonitrile, polychloroprene, nitrile rubber, acrylic and methacrylic polymers and copolymers thereof, and mixtures thereof, said second latex having a Mooney viscosity of between 10 and 70 and being selected from the group consisting of polyisoprene, and polymers of 1,3-pentadiene, and said second latex having a particle size in the range of between 2,000 and 10,000 A. and being present in an amount by weight of between 20% and 80% of the combined weight of said latices.

2. A resilient filler product as set forth in claim 1 wherein said synthetic rubber latex is a copolymer of styrene-butadiene having between 1% and 30% of bound styrene.

3. A product as set forth in claim 2 wherein said copolymer forms an envelope around said finely divided resin material.

4. A product as set forth in claim 3 wherein said second latex is polyisoprene.

5. A product as set forth in claim 1 wherein said free rate of return is between 18 and 20 inches per minute.

6. A method of producing a resilient open pore interconnected vulcanized foam comprising the steps of providing a reaction mixture including a base latex and a second latex, said base latex having a Mooney viscosity of between 100 and 160 and being a synthetic rubber latex of particle size in the range of 1,000 to 7,500 A. and selected from the group consisting of styrene-butadiene copolymers and acrylonitrile-butadiene copolymers, said base latex having admixed therewith between 5 and 25 parts based on the weight of said base latex of a finely divided resin material different from said base latex and said second latex and selected from the group consisting of polyethylene, polystyrene, polyacrylonitrile, polychloroprene, nitrile rubber, acrylic and methacrylic polymers and copolymers and mixtures thereof, said second latex having a Mooney viscosity of between 10 and 70 and being selected from the group consisting of polyisoprene and polymers of 1,3-pentadiene, said second latex having a particle size in the range of 2,000 to 10,000 A. and being present in said reaction mixture in an amount by weight of between 20% and 80% of the combined weight of said latex, adding to the said reaction mixture an accelerator, a vulcanizing agent, an aqueous soluble fatty acid soap, a precipitating agent for said soap and a sufficient amount of alkaline material to provide a pH in the range of 8.5 to 11.0, whipping said mixture to form a froth having air bubbles distributed therethrough, introducing said mixture into a mold and drawing a vacuum thereon for expanding said froth mixture into a foam, freezing said expanded mixture to cause solidification thereof, forcing an acid reacting gas through said foam to reduce the pH to less than 8.5 to effect reaction between said fatty acid soap and said precipitating agent to stiffen said foam, and heating said stiffened foam at a temperature sufficient to effect rection of said accelerator, vulcanizing agent and reaction mixture to form a vulcanized resilient foamed product.

7. A method as set forth in claim 6 wherein said synthetic rubber latex is a copolymer of styrene-butadiene having between 1% and 30% bound styrene.

8. A method as set forth in claim 7 wherein said copolymer forms an envelope around said finely divided resin material.

9. A method as set forth in claim 8 wherein said second latex is polyisoprene.

10. A method as set forth in claim 6 wherein the vulcanized resilient filler product has a free rate of return between 16 and 22 inches per second, an RMA compression value of between 2 and 5 pounds, and including not less than 90% interconnected open pores.

References Cited

UNITED STATES PATENTS

| 2,873,259 | 2/1959 | Clark | 260—2.5 |
| 3,238,192 | 3/1966 | Talalay et al. | 260—2.5 |

FOREIGN PATENTS

| 537,910 | 3/1957 | Canada. |

SAMUEL H. BLECH, Primary Examiner

MORTON, FOELAK, Assistant Examiner

U.S. Cl. X.R.

260—29.7, 41.5, 887, 889, 890, 892, 893, 894